(12) United States Patent
Pan

(10) Patent No.: US 6,249,625 B1
(45) Date of Patent: Jun. 19, 2001

(54) FIBEROPTIC DEVICES WITH A JOINED OPTICAL FIBER SUBASSEMBLY

(75) Inventor: Jing-Jong Pan, Milpitas, CA (US)

(73) Assignee: E-Tek Dynamics, Inc., San Jose, CA (US)

( * ) Notice: Subject to any disclaimer, the term of this patent is extended or adjusted under 35 U.S.C. 154(b) by 0 days.

(21) Appl. No.: 09/342,456

(22) Filed: Jun. 28, 1999

(51) Int. Cl.$^7$ ........................................... G02B 6/26
(52) U.S. Cl. ........................ 385/43; 385/24; 385/34
(58) Field of Search ........................... 385/39, 43, 46, 385/24, 34, 121

(56) References Cited

U.S. PATENT DOCUMENTS

| | | | | |
|---|---|---|---|---|
| 4,355,863 | * | 10/1982 | Aulich et al. | |
| 5,067,792 | * | 11/1991 | Lloyd | 385/32 |
| 5,555,330 | | 9/1996 | Pan et al. | 385/39 |
| 5,742,712 | | 4/1998 | Pan et al. | 385/18 |
| 5,764,830 | | 6/1998 | Pan et al. | 385/39 |

\* cited by examiner

*Primary Examiner*—Hung N. Ngo
(74) *Attorney, Agent, or Firm*—Townsend and Townsend and Crew LLP

(57) ABSTRACT

The present invention provides for a joined optical fiber subassembly having first, second and third sections. The first section has a plurality of separate optical fibers with each optical fiber having a core and cladding. The second section, which adjoins the first section, has the optical fibers joined so that a single cladding encloses the cores of the optical fibers. The third section, which adjoins the second section, has the single cladding enclosing the cores of the optical fibers. With the joined optical fiber subassembly as a constituent element, a subunit which can be used in many fiberoptic devices can be created.

15 Claims, 4 Drawing Sheets

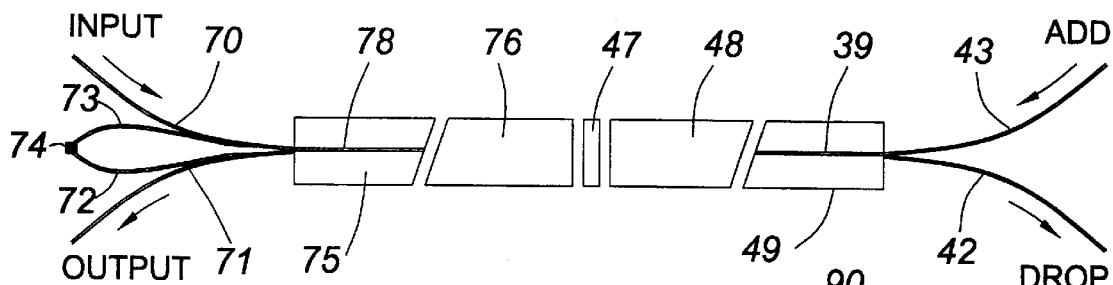
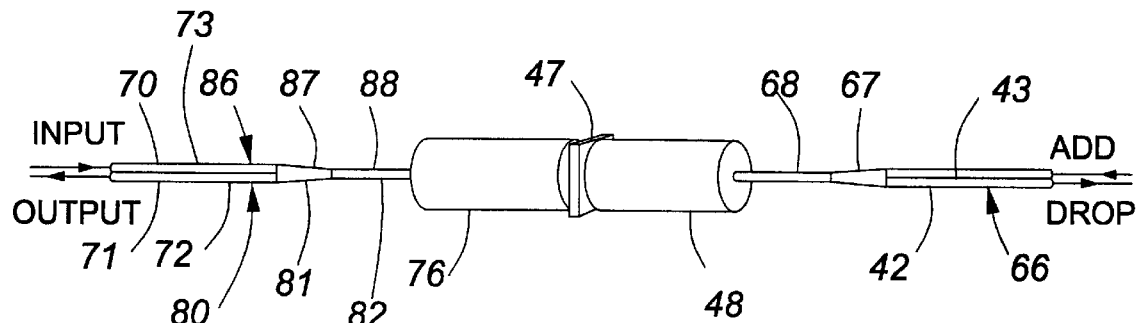
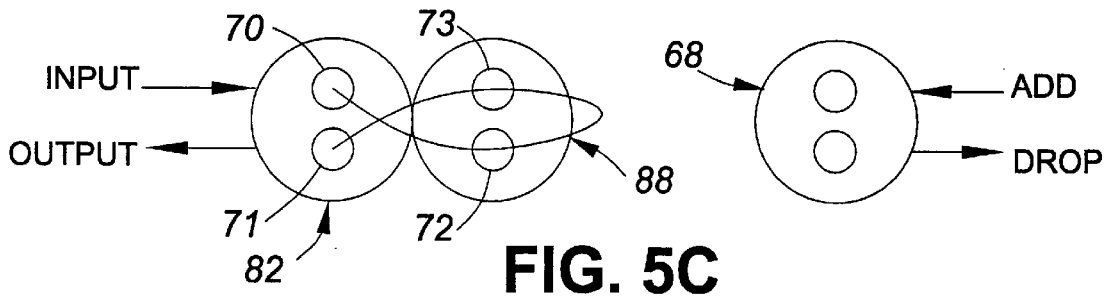
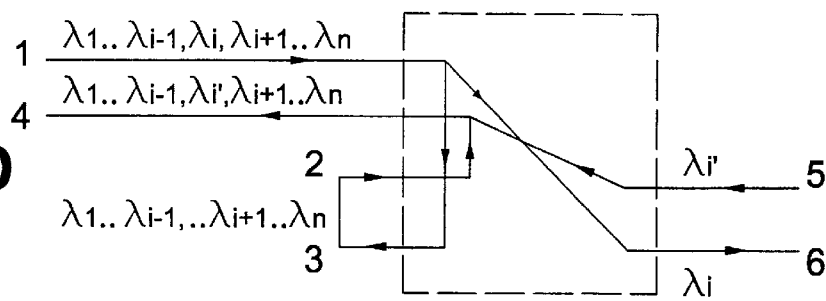

FIBEROPTIC DEVICES WITH A JOINED OPTICAL FIBER SUBASSEMBLY

BACKGROUND OF THE INVENTION

The present invention is related to optical fibers and their manufacturing methods and, in particular, to optical fiber subassemblies in which a plurality of separate optical fibers are joined together.

A standard optical fiber has a relatively simple structure with a central core and a surrounding cladding. The core has one index of refraction and the cladding has a different index of refraction (typically less than the core index of refraction). The core and cladding have constant diameters along the length of the fiber. Depending upon the diameter of the core, the optical fiber can be a single mode fiber or a multimode fiber.

Variations from the standard optical fiber include fibers with multiple cores in which two or three parallel cores of constant diameters are enclosed by the surrounding cladding. As in the case of standard optical fibers, such multiple core fibers are manufactured with preforms and drawing techniques. Examples of such fibers include the polarization-maintaining optical fiber with its characteristic "mouse ears" cross-section. Another variation from the standard optical fiber is the thermally expanded core optical fiber in which the single core of the fiber is gradually enlarged in a taper. Such fibers are often used as light receptors because of the larger cross-sectional area of the core.

Recently optical devices have been developed in which two or more optical fibers are held in a sleeve. Light is transmitted (and received) through the end facets of the optical fibers. Such optical devices include WDM (Wavelength Division Multiplexing) couplers, add/drop multiplexers, tunable filters, optical switches, and so forth. See, for example, Nonetheless, it remains desirable to lower the manufacturing costs and reliability of these optical devices. For some purposes, the thermally expanded core optical fibers may be used since the larger cores increase manufacturing tolerances. However, such fibers are relatively expensive.

Hence there is a continued need for improvements in the manufacture of fiberoptic devices. The present invention provides for such an improvement for many fiberoptic devices.

SUMMARY OF THE INVENTION

The present invention provides for a joined optical fiber subassembly comprising first, second and third sections. The first section has a plurality of separate optical fibers with each optical fiber having a core and cladding, which encloses the core of the optical fiber. The second section, which adjoins the first section, has the optical fibers joined so that a single cladding encloses the cores of the optical fibers. The diameter of the single cladding in this section decreases in a taper away from the first section and the diameter of each core of the optical fibers increases in a taper away from said first section. The third section, which adjoins the second section, has the single cladding enclosing the cores of the optical fibers and having a constant diameter. The cores of the optical fibers in this section also have constant diameters.

With the joined optical fiber subassembly as a constituent element, the present invention also provides for a subunit which can be used in many fiberoptic devices. The subunit has a sleeve with a central longitudinal channel and an end face. The channel holds the third section of the joined optical fiber subassembly and the end facets of the cores of the optical fibers are co-planar with the sleeve end face. The subunit also has a quarter-pitch GRIN lens which has an end face proximate the sleeve end face. By arranging the location of the core end facets with respect to the optical axis of the GRIN lens, the paths of the light to and from the cores of the third section through the GRIN lens can be adjusted according to the requirements of the fiberoptic device.

BRIEF DESCRIPTION OF THE DRAWINGS

FIG. 4F is a symbolic representation of all the light paths through the FIG. 4A device;

FIG. 5A is a cross-sectional representational side view of a WDM add/drop multiplexer device, according to still another embodiment of the present invention;

FIG. 5B is a perspective view of the FIG. 5A multiplexer device;

FIG. 5C is a representative end view of the joined sections of the joined optical fiber subassemblies in the FIG. 5A device; and FIG. 5D is a symbolic representation of the light paths through the FIG. 5A device.

DESCRIPTION OF THE SPECIFIC EMBODIMENTS

Figure 1A:
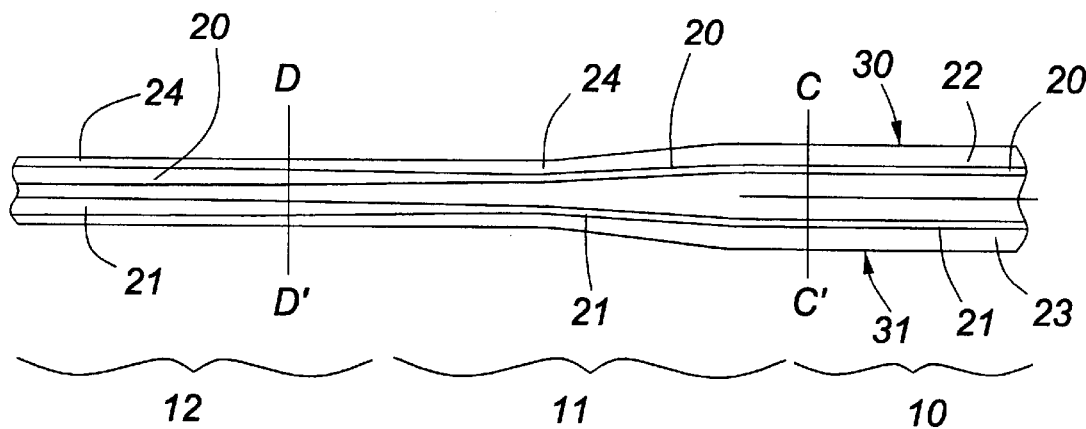
FIG. 1A is a top view of a joined optical fiber configuration according to one embodiment of the present invention.
Figure 1B:
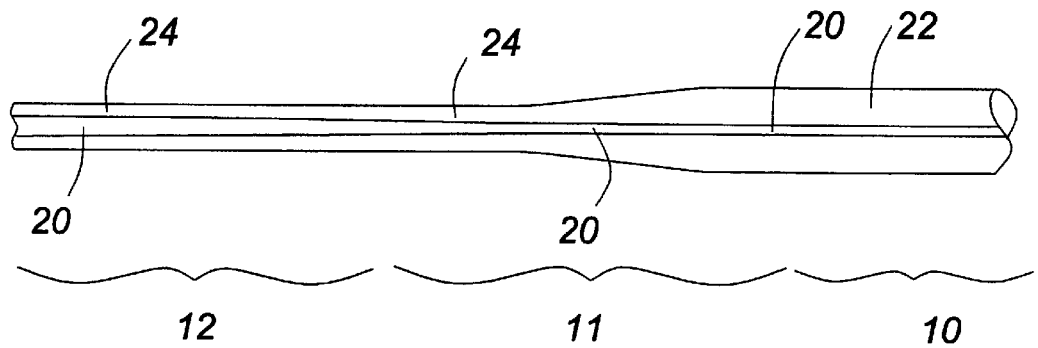
FIG. 1B is a side view of the optical fiber configuration of FIG. 1A.

FIGS. 1A and 1B illustrates the general arrangement of a joined optical fiber subassembly according to one embodiment of the present invention. In the top view of FIG. 1A, two separate optical fibers 30 and 31 are joined together such that cores of the two fibers 30 and 31 remain separate in a single cladding. The subassembly can be organized into three sections. A section 10 has the optical fibers 30 and 31 separated and independent; a section 12 has the fibers completely joined into a single cladding; and a section 11 between the sections 10 and 11 represents a transition region from separate optical fibers to completely joined fibers.

Figure 1C:
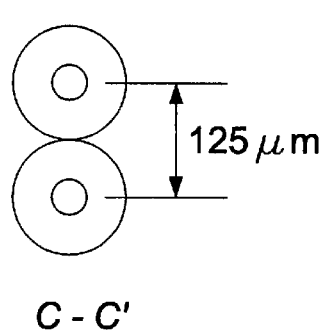
Fig. 1C is a cross-sectional view of the optical fiber configuration along line A–A' in FIG. 1A.

In the section 10 of the subassembly, the two separate optical fibers 30 and 31 have their own core and surrounding cladding. The fiber 30 has a core 20 with cladding 22 and the fiber 31 has core 21 with cladding 23. In the present embodiment, the two optical fibers 30 and 31 are single mode fibers, specifically SMF-28 fibers, each fiber having a cladding outside diameter of 125μm and a core diameter of 8.3μm. FIG. 1C is a cross-section along a dotted line C–C' in FIG. 1A of the two fibers 30 and 31. Since the center radius of each fiber 30 and 31 is 62.5μm (125μm/2), the center axes of the two fibers are separated by 125μm. Likewise, the width across the cladding of the two fibers touching is 250μm.

Figure 1D:
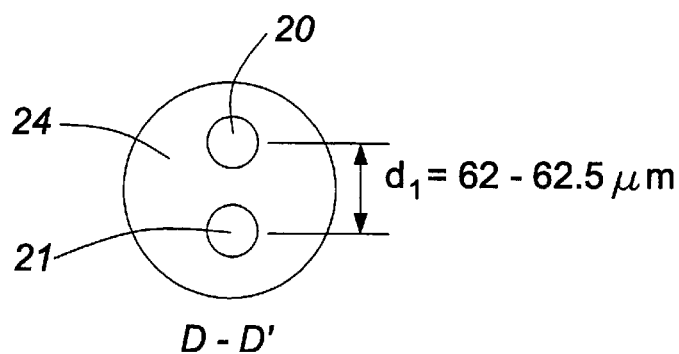
FIG. 1D is a cross-sectional view of the optical fiber configuration along line C–C' in FIG. 1A.

In the section 12, the fibers 30 and 31 are joined together into a single fiber. Each core 20 and 21 is still separated from the other, but a single cladding 24 surrounds both cores. In this section the diameters of the cores 20 and 21, along with that of the cladding 24 are constant. But as shown in FIG. 1D, a cross-section end view along a dotted line D–D' in FIG. 1A, the cores 20 and 21 are closer together, as compared to the separation in the section 10. The center axes of the two cores 20 and 21 are approximately 62.0 to 62.5μm apart. Furthermore, the diameters of the cores 20 and 21 have expanded in this section 12 in a range of 18 to 22μm and the diameter of the cladding 24 across the two cores is approximately 177μm.

Figure 2:
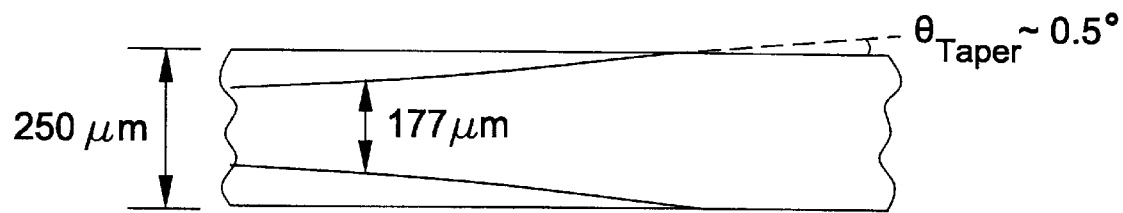
FIG. 2 is a detailed view of the optical fiber configuration of FIG. 1A.

The section 11 is the transition region where the separate fibers 30 and 31 of section 10 merge into a single fiber of section 12. Near the section 10 the two fibers 30 and 31 begin as separate fibers. The two claddings 22 and 23 merge into a single cladding 24 as one moves toward the section 12. It should be noted that the diameters of the cores 20 and 21, along with that of the cladding 24, undergo changes. The cladding 24 forms a narrowing taper in the direction from the section 10 to the section 12. On the other hand, the cores 20 and 21 form an expanding taper in the same direction. These features may be best seen in FIG. 1B, a side view of the unitary optical fiber subassembly. Starting from the narrow diameter of the single mode fiber cores 20 and 21 in section 10, the cores gradually expand into the large diameter cores in the section 12. Conversely, the claddings 22 and 23 in the section 10 narrow into the single cladding 24 in the section FIG. 2 has more details of the transition section 11. From the fork formed by the merging of the two fibers 30 and 31 to the beginning of the section 12 is 4 mm. The angle $\theta_{taper}$, approximately 0.5°, represents the taper angle as shown in FIG. 2.

The technique of manufacturing a joined optical fiber subassembly is described in U.S. application Ser. No. 09/275,354, entitled "THERMALLY EXPANDED MULTIPLE CORE FIBER," and filed Mar. 23, 1999 by Yong Huang and assigned to the present assignee. This patent application is incorporated by reference.

Figure 3A:
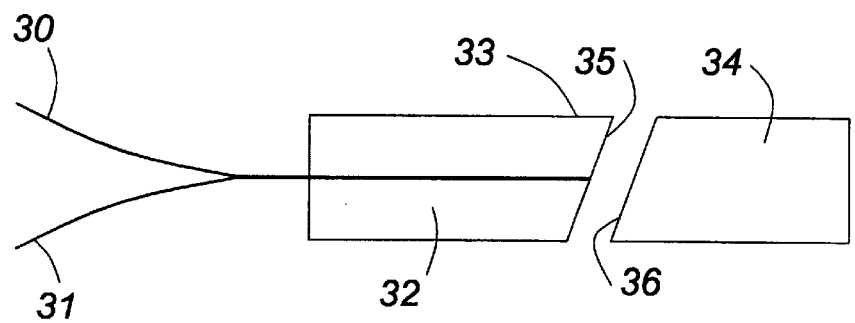
FIG. 3A is a cross-sectional representational side view of a joined optical fiber subassembly, according to another embodiment of the present invention.
Figure 3B:
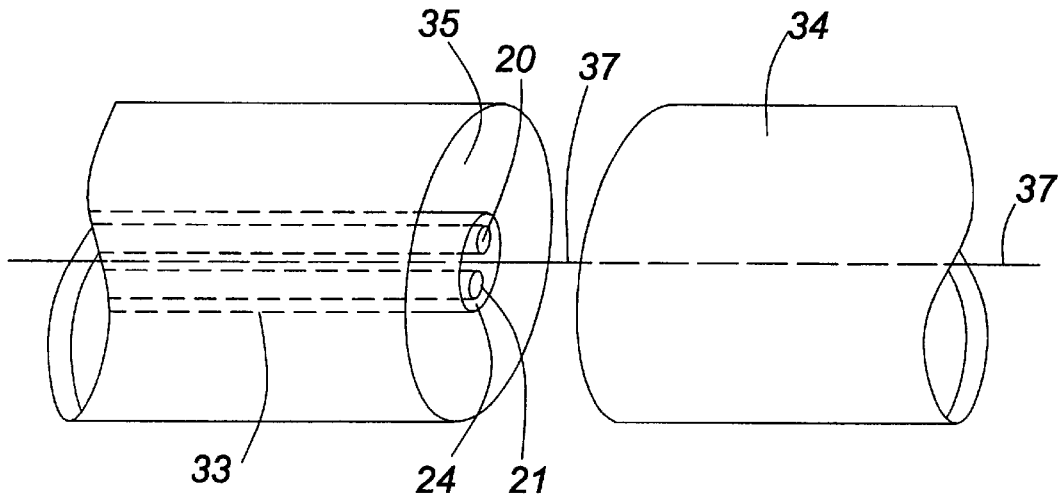
FIG. 3B is a detailed perspective view of the joined optical fiber subassembly in a sleeve and a GRIN lens of FIG. 3A.

FIGS. 3A and 3B illustrate a subunit of elements including the described joined optical fiber subassembly which may be advantageously utilized in many fiberoptic devices. The transition and joined sections 11 and 12 of the joined optical fiber subassembly is inserted and fixed in a central longitudinal channel 33 of a glass sleeve 32. An end face 35 of the sleeve 32 is polished at a small angle 8–12° from the plane perpendicular to the longitudinal axis of the sleeve 32. Facing the end face 35 is the reciprocally slanted end face 36 of a quarter-pitch GRIN (GRaded INdex) lens 34. Both end faces 35 and 36 are coated with anti-reflection material. FIG. 3B shows the end facets of the expanded cores 20 and 21 with the surrounding cladding 24 in the joined section 12. The end facets are co-planar with the end face 35 and are also coated with the anti-reflection material. A line 37 represents the optical axis of the GRIN lens 34 and the alignment of the end facets of the cores 20 and 21 on either side of the axis.

This subunit is easier to assemble than a similar combination with individual optical fibers inserted into the sleeve. See, for example, U.S. Pat. No. 5,555,330, entitled "WAVELENGTH DIVISION MULTIPLEXED COUPLER WITH LOW CROSSTALK BETWEEN CHANNELS AND INTEGRATED COUPLER/ISOLATOR DEVICE," which issued Sep. 10, 1996 to J. J. Pan et al. and is assigned to the present assignee. Furthermore, with the present invention, alignment tolerances are more lenient and insertion losses are reduced because of the larger diameters of the expanded cores 20 and 21.

FIGS. 4A–4F illustrate a fiberoptic add/drop multiplexer 50, which is improved by the subunit described above. Upon connection to a WDM (Wavelength-Division-Multiplexed) fiberoptic network, the add/drop multiplexer 50 removes (i.e., drops) and inserts (i.e., adds) optical signals at a particular wavelength from, and into, a network fiber. For example, in a ring network, such add/drop multiplexers are often used with each user. As the optical signals circulate about the ring, the WDM multiplexer associated with a user removes (drops) signals of a preselected wavelength, $\lambda_i$, from the network fiber for the user and inserts (adds) signals from the user at the same wavelength, $\lambda_i'$ (the prime punctuation mark designates that the source is the user), into the network fiber for transmission to other parts of the network.

Figure 4A:
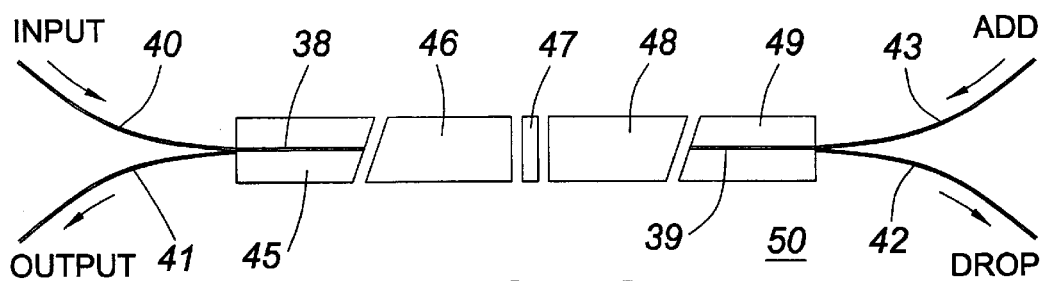
FIG. 4A is a cross-sectional representational side view of a WDM add/drop multiplexer device, according to another embodiment of the present invention.

FIG. 4A is a representation of a cross-sectional side view of the WDM multiplexer 50, according to the present invention. The multiplexer 50 has two subunits of FIGS. 3A–3B and a wavelength-dependent filter 47 between them. The first subunit has a glass sleeve 45 with a central longitudinal channel 38 associated with two optical fibers 40 and 41 and a GRIN lens 46. The second subunit has a second sleeve 49 with a central longitudinal channel 39 associated with two optical fibers 42 and 43 and a second GRIN lens 48. The optical fiber 40 operates as the network input fiber carrying network signals at different network channel wavelengths, $\lambda_1, \lambda_2, \ldots \lambda_n$ from which the wavelength-dependent filter 47 selects a particular wavelength $\lambda_i$. Depending upon the wavelength $\lambda_i$ with respect to the network channel wavelengths, the filter 47 may be a dichroic filter, i.e., a low-pass or high-pass filter, or a bandpass filter. Light at the wavelength $\lambda_i$ is transmitted through the filter 47 and received by the optical fiber 42, which acts as the drop fiber. On the other hand, light reflected by the selective filter 47, i.e., light not at wavelength $\lambda_i$, i.e., light at wavelengths, $\lambda_1, \lambda_2, \ldots, \lambda_{i-1}, \lambda_{i+1}, \ldots, \lambda_n$, is passed to the optical fiber 41, which acts as the network output fiber. The optical fiber 43 operates as an add fiber and carries incoming light signals at the same wavelength transmitted by the filter 47, i.e., light at wavelength $\lambda_i'$, into the multiplexer 50. The transmitted light denoted by $\lambda_i'$ passes into the network output fiber 41, which now carries light at wavelengths, $\lambda_1, \lambda_2, \ldots, \lambda_i', \ldots \lambda_n$.

Figure 4B:
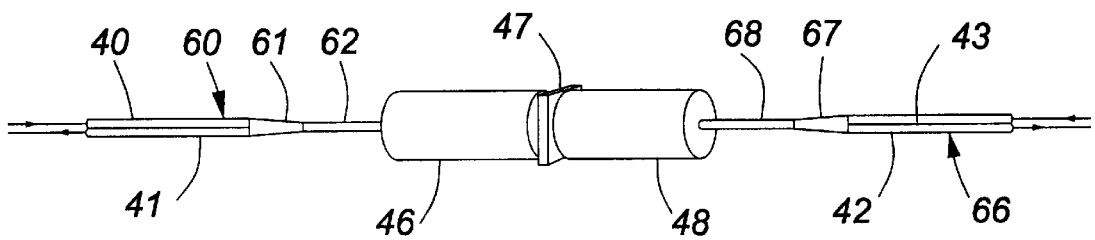
FIG. 4B is a perspective view of the FIG. 4A WDM add/drop multiplexer device.
Figure 4C:
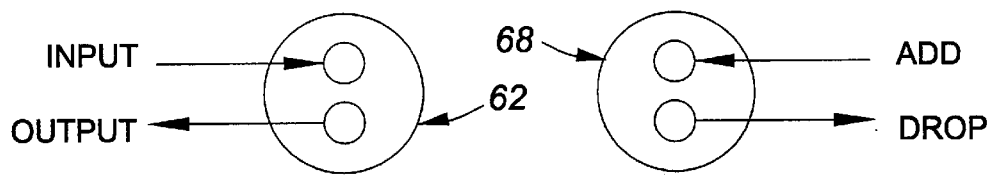
FIG. 4C is a representative end view of the joined sections of the joined optical fiber subassembly in the FIG. 5A device.

FIG. 4B better illustrates the optical fiber assemblies in the multiplexer 50 which is shown without the sleeves 45 and 49. FIG. 4C is a representational cross-sectional end views of the joined sections 62 and 68 of the two optical fiber subassemblies. The cores corresponding to the network input fiber 40 and network output fiber 41, and to the add fiber 42 and drop fiber 43 are indicated.

Figure 4D:
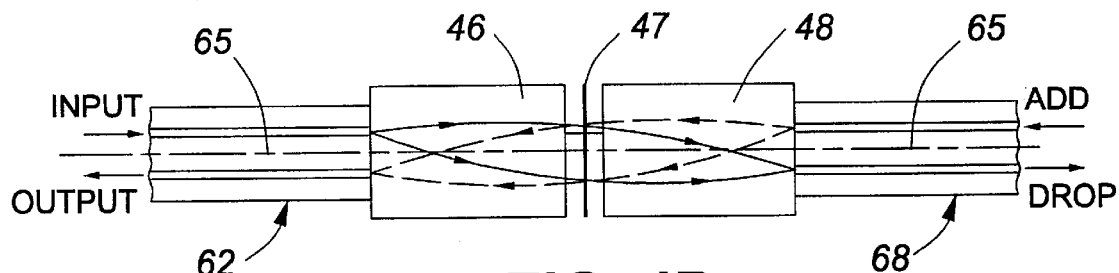
FIG. 4D illustrates the drop and add light paths through the FIG. 4A device.
Figure 4E:
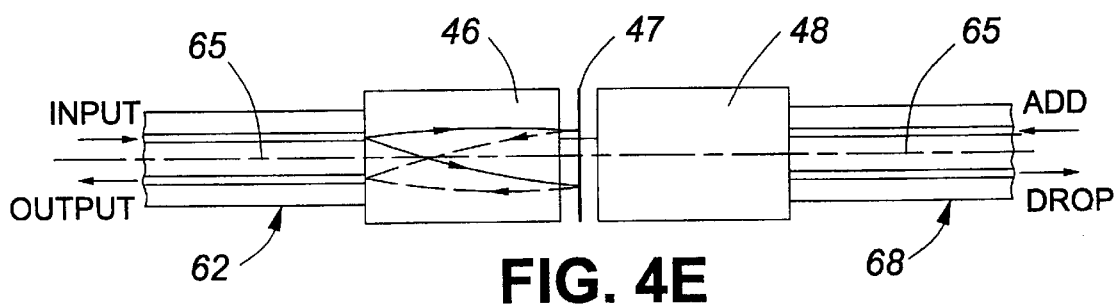
FIG. 4E illustrates the paths of the light which are not transmitted through the FIG. 4A device.

FIGS. 4D and 4E illustrate the arrangement of the two subunits and the wavelength-dependent filter 47 of the multiplexer 50 and its resulting operation. The dotted line 65 indicates the aligned optical axes of the two GRIN lenses 46 and 48 of the two subunits. FIG. 4D shows the paths of light at the wavelength transmitted by the filter 47. Light at wavelength $\lambda_i$, in the input network fiber 40 travels through its corresponding core in the joined section 62, is collimated by the quarter-pitch GRIN lens 46, and transmitted to the wavelength-dependent filter 47. With the wavelength-dependent filter 47 arranged perpendicularly to the aligned axes indicated by the line 65, light on one side of the aligned optical axes appears on the other side of the axes. That is, light which is passed by the filter 47 to the second quarter-pitch GRIN lens 48 is refocused on the end facet of the core in the joined section 68 corresponding to the drop optical fiber 42. Likewise, light at the same wavelength $\lambda_i'$ in the add optical fiber 43 travels down its corresponding core in the joined section 68, is collimated by the second quarter-pitch GRIN lens 48, and transmitted to the wavelength-dependent filter 47. The light is passed by the filter 47 to the first quarter-pitch GRIN lens 46 which refocuses the light on the end facet of the core in the joined section 62 corresponding to the output optical fiber 41.

FIG. 4E show the path of light from the network input fiber 40 at wavelengths which are not transmitted by the wavelength-dependent filter 47. The light at these wavelengths, i.e., $\lambda_1, \lambda_2, \ldots, \lambda_{i-1}, \lambda_{i+1}, \ldots, \lambda_n$, is collimated by the GRIN lens 47, reflected by the filter 47 and refocused on the end facet of the core in the joined section 62 corresponding to the output optical fiber 41. FIG. 4F illustrates the light paths between the different optical fibers 40–43 through the coupler 50.

FIGS. 5A–5D illustrate still another embodiment of the improved optical add/drop multiplexer, according to the present invention. The multiplexer 90 has the same function as the multiplexer described above, but in this optical device there are two subunits with three joined optical fiber subassemblies. As shown in FIG. 5A, the right half of the multiplexer 90 is the same as that of the multiplexer 50 above. However, the left half of the multiplexer 90 is formed by a subunit having two joined optical fiber subassemblies inserted into a center channel 78 of a ferrule 75 and a correspondingly aligned quarter-pitch GRIN lens 76. One joined optical fiber subassembly is represented by a network input optical fiber 70 and network output optical fiber 71, which form the separated section 80 of the optical fiber subassembly. The second joined optical fiber subassembly is represented two loop optical fibers 72 and 73 which are joined together in a splice 74.

FIG. 5B better illustrates the optical fiber assemblies in the multiplexer 90 which is shown without the sleeves 75 and 49. Associated with the left subunit, the first joined optical fiber subassembly has a joined section 82 next to the GRIN lens 76, a transition section 81 and a separate section 80 including the optical fibers 70 and 71. The second joined optical fiber subassembly associated with the left subunit is shown partially in the perspective view of FIG. 5B. That subassembly has a joined section 88 next to the GRIN lens 76 and behind the joined section 82 of the first joined optical fiber subassembly, a transition section 87 behind the transition section 81 and a separated section 86 with optical fibers 72 and 73 behind the optical fibers 70 and 71.

The left portion of FIG. 5C is a end view of the joined sections 82 and 88 to illustrate their arrangement in the channel 78 of the ferrule 75. The arrows indicate the path of light at wavelengths which are not transmitted by the wavelength-dependent filter 47. The light from the network input fiber 70 is reflected by the filter 47 back into the end facet of the core corresponding to the loop fiber 72. The ends of the loop optical fibers 72 and 73 are spliced together to form a loop so that the light leaves through the core of the fiber 72 and re-enters through the core of the loop fiber 73. The light is once again reflected by the wavelength-dependent filter 47, but this time the light enters the end facet of the core of the network output fiber 71. On the other hand, the GRIN lens 48 of the right subunit is aligned with the left subunit GRIN lens 76 so that light transmitted by the filter 47 from the input fiber 70 is refocused on the end facet of the core corresponding to the drop fiber 42 and light transmitted by the filter 47 from the add fiber 43 is refocused on the end facet of the core corresponding to the network output fiber 71.

Thus the WDM add/drop multiplexer 90 functions is the same manner as the multiplexer 50. As illustrated by FIG. 5D, from the light at network channel wavelengths, $\lambda_1, \lambda_2, \ldots, \lambda_{i-1}, \lambda_i, \lambda_{i+1}, \ldots, \lambda_n$, being carried on the network input fiber 70, the multiplexer 90 transmits signals at one wavelength, $\lambda_i$, to the drop fiber 42. Signals to the network at the same wavelength $\lambda_i'$, on the add fiber 43 are passed to the network output fiber 71. Light at the other channel wavelengths, i.e., $\lambda_1, \lambda_2, \ldots, \lambda_{i-1}, \lambda_{i+1}, \ldots, \lambda_n$, are simply passed from the network input fiber 70 to the network output fiber 71. The multiplexer 90 has improved wavelength channel isolation because the light is reflected twice off the wavelength-dependent filter 47. This effectively removes light at wavelength $\lambda_i$ received from the network input fiber 70 from being passed to the network output fiber 71.

Thus the joined optical fiber subassembly, especially if included in the subunit described above, speeds manufacturing processes and eases tolerances in these processes for many fiberoptic devices. The WDM add/drop multiplexers described above are improvements of novel WDM add/drop multiplexers, which are described in co-pending U.S. application Ser. No. 09/111,473, entitled "IMPROVED ADD/DROP WDM MULTIPLEXER FOR FIBEROPTIC NETWORKS," filed Jul. 8, 1998 by J. J. Pan and Tian Zhu, and assigned to the present assignee. Other fiberoptic devices should also benefit from the present invention. For example, see the devices described in U.S. Pat. No. 5,742,712, entitled "EFFICIENT ELECTRO MECHANICAL OPTICAL SWITCHES," which issued Apr. 21, 1998 to J. J. Pan, Jing-Yu xu and Charlene Jia-Ling Yang; and U.S Pat. No. 5,764,830, entitled "1XN AND NXN FIBER OPTIC COUPLERS," which issued Jun. 9, 1998 to J. J. Pan, Ming Shih, Weiti Wu, Yu-li Ko and Donna S. Yu.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A joined optical fiber subassembly comprising
    a first section having a plurality of independent optical fibers, each optical fiber having a core and cladding, said cladding enclosing said core of said optical fiber;
    a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section; and a third section adjoining said second section, said third section having said single cladding enclosing said cores of said optical fibers, said diameter of said single cladding a constant diameter and said cores of said optical fibers having constant diameters.

2. The joined optical fiber subassembly of claim 1 wherein said first section has cores separated by 125 μm.

3. The joined optical fiber subassembly of claim 2 wherein said third section has said cores separated by less than 65 μm.

4. The joined optical fiber subassembly of claim 3 wherein said third section has said cores separated in the range of 62.0 to 62.5 μm.

5. The joined optical fiber subassembly of claim 1 wherein said first section comprises two optical fibers only.

6. The joined optical fiber subassembly of claim 1 wherein said first section comprises single mode optical fibers.

7. The joined optical fiber subassembly of claim 1 wherein said first section has fibers with said cores having diameters approximately 8.3 μm and said third section has cores having diameters approximately 20 μm.

8. A joined optical fiber subassembly comprising a first section having a plurality of independent optical fibers, each optical fiber having a core and cladding, said cladding enclosing said core of said optical fiber; and a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section.

9. The joined optical fiber subassembly of claim 8 wherein said first section has cores separated by 125 μm.

10. The joined optical fiber subassembly of claim 8 said first section comprises two optical fibers only.

11. The joined optical fiber subassembly of claim 8 wherein said first section comprises single mode optical fibers.

12. A subunit for fiberoptic devices comprising a joined optical fiber subassembly having a first section having a plurality of independent optical fibers, each optical fiber having a core and cladding, said cladding enclosing said core of said optical fiber;

a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section; and a third section adjoining said second section, said third section having said single cladding enclosing said cores of said optical fibers, said diameter of said single cladding a constant diameter and said cores of said optical fibers having constant diameters;

a sleeve having a central longitudinal channel and an end face, said channel holding said third section of joined optical fiber subassembly, said cores of said optical fibers having end facets, said end facets co-planar with said end face of said sleeve; and a quarter-pitch GRIN lens having an end face proximate said sleeve end face.

13. The subunit of claim 12 wherein said sleeve end face is slanted and said GRIN lens end face is slanted reciprocally to said sleeve end face.

14. An WDM multiplexer comprising a wavelength-dependent filter;

first and second subunits arranged with said wavelength-dependent filter therebetween, each subunit having a joined optical fiber subassembly having a first section having first and second independent optical fibers, each optical fiber having a core and cladding, said cladding enclosing said core of said optical fiber;

a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section; and a third section adjoining said second section, said third section having said single cladding enclosing said cores of said optical fibers, said diameter of said single cladding a constant diameter and said cores of said optical fibers having constant diameters;

a sleeve having a central longitudinal channel and an end face, said channel holding said third section of joined optical fiber subassembly, said cores of said optical fibers having end facets, said end facets co-planar with said end face of said sleeve; and a quarter-pitch GRIN lens having first and second end faces, said first end face proximate said sleeve end face;

said wavelength-dependent filter proximate said second end face of said first and second subunits, said wavelength-dependent filter reflecting or passing light responsive to wavelength of light incident thereupon, said wavelength-dependent filter, said GRIN lens and said end facets of said first and second optical fibers of said first and second subunits arranged with respect to each other so that light from said first optical fiber of said first subunit and reflected by said wavelength-dependent filter passes into said second optical fiber of said first subunit, light from said first optical fiber of said first subunit and transmitted by said wavelength-dependent filter passes into said second optical fiber of said second subunit, and light from said first optical fiber of said second subunit and transmitted by said wavelength-dependent filter passes into said second optical fiber of said first subunit;

whereby said WDM multiplexer may be operate as an add/drop WDM multiplexer by connecting said first optical fiber of said first subunit as a network input fiber, said second optical fiber of said first subunit as a network output fiber, said second optical fiber of said second subunit as a drop fiber and said first optical fiber of said second subunit as an add fiber.

15. An WDM multiplexer comprising a wavelength-dependent filter;

first and second subunits arranged with said wavelength-dependent filter therebetween, said first subunit having first and second jointed optical fiber assemblies, each joined optical fiber subassembly having a first section having first and second independent optical fibers, each optical fiber having a core and cladding, said cladding enclosing said core of said optical fiber; a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section; and a third section adjoining said second section, said third section having said single cladding enclosing said cores of said optical fibers, said diameter of said single cladding a constant diameter and said cores of said optical fibers having constant diameters;

a sleeve having a central longitudinal channel and an end face, said channel holding said third sections of said first and second joined optical fiber subassemblies, said cores of said optical fibers of said first and second joined fiber subassemblies having end facets, said end facets co-planar with said end face of said sleeve; and a quarter-pitch GRIN lens having first and second end faces, said first end face proximate said sleeve end face; said second subunit having a joined optical fiber subassembly having a first section having first and second independent optical fibers, each optical fiber having a core and cladding, said cladding enclosing said core of said optical fiber; a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section; and a third section adjoining said second section, said third section having said single cladding enclosing said cores of said optical fibers, said diameter of said single cladding a constant diameter and said cores of said optical fibers having constant diameters;

a sleeve having a central longitudinal channel and an end face, said channel holding said third section of joined optical fiber subassembly, said cores of said optical fibers having end facets, said end facets co-planar with said end face of said sleeve; and a quarter-pitch GRIN lens having first and second end faces, said first end face proximate said sleeve end; said wavelength-dependent filter proximate said second end face of said first and second subunits, said wavelength-dependent filter reflecting or passing light responsive to wavelength of light incident thereupon, said wavelength-dependent filter, said GRIN lens and said end facets of said first and second optical fibers of said first and second joined optical fiber subassemblies in said first subunit and said end facets of said first and second optical fibers of said second subunit arranged with respect to each other so that light from said first optical fiber of said first joined optical fiber subassembly in said first subunit and reflected by said wavelength-dependent filter passes into said second optical fiber of said second joined optical fiber subassembly in said first subunit, light from said first optical fiber of said second joined optical fiber subassembly in said first subunit and reflected by said wavelength-dependent filter passes into said second optical fiber of said first joined optical fiber subassembly in said first subunit, light from said first optical fiber of said first joined optical fiber subassembly in said first subunit and transmitted by said wavelength-dependent filter passes into said second optical fiber of said second subunit, and light from said first optical fiber of said second subunit and transmitted by said wavelength-dependent filter passes into said second optical fiber of said first joined optical fiber subassembly in said first subunit;

whereby said WDM multiplexer may be operate as an add/drop WDM multiplexer by connecting said first optical fiber of said first optical fiber subassembly in said first subunit as a network input fiber, said second optical fiber of said first optical fiber subassembly in said first subunit as a network output fiber, said second optical fiber of said second subunit as a drop fiber and said first optical fiber of said second subunit as an add fiber, and joining together said first and second optical fibers of said second optical fiber subassembly in said first subunit.

* * * * *